United States Patent
Kaneko

[11] 4,099,842
[45] Jul. 11, 1978

[54] WIDE FIELD EYEPIECE LENS SYSTEM

[75] Inventor: Masanobu Kaneko, Kawasaki, Japan

[73] Assignee: Nippon Kogaku K.K., Tokyo, Japan

[21] Appl. No.: 748,474

[22] Filed: Dec. 8, 1976

[30] Foreign Application Priority Data

Dec. 12, 1975 [JP] Japan .................. 50-147385

[51] Int. Cl.² ................... G02B 9/30; G02B 9/34
[52] U.S. Cl. .................. 350/175 E; 350/176; 350/220; 350/229
[58] Field of Search ........... 350/175 E, 225, 229, 350/220, 176

[56] References Cited

U.S. PATENT DOCUMENTS

3,888,567  6/1975  Shoemaker .............. 350/175 E X
3,975,088  8/1976  Shoemaker ................ 350/175 E

*Primary Examiner*—Paul A. Sacher
*Attorney, Agent, or Firm*—Shapiro and Shapiro

[57] ABSTRACT

An eyepiece lens system having an apparent field of view more than 60° and an eye relief greater than 80% of the total focal length of itself comprises a first lens group, a second lens group disposed rearwardly of the first lens group and a third lens group disposed rearwardly of the second lens group. The first lens group includes a positive meniscus lens component with its convex surface facing rearward, the second lens group includes a cemented positive doublet lens component consisting of a biconvex lens element and a negative meniscus lens element, and the third lens group includes at least a positive meniscus lens component with its convex surface facing forward. The eyepiece lens system satisfies predetermined optical conditions.

2 Claims, 4 Drawing Figures

WIDE FIELD EYEPIECE LENS SYSTEM

BACKGROUND OF THE INVENTION

1. Field of the Invention

This invention relates to a wide field eyepiece.

2. Description of the Prior Art

To facilitate observation of the entire field of view in an eyepiece, the eye relief should desirably be at least 80% or greater of the focal length of the eyepiece. It is known, however, that as the apparent field of view of the eyepiece is increased with various aberrations of the marginal rays maintained constant, the eye relief is decreased. Also, as the eye relief is increased with the apparent field of view maintained constant, the diameter of the lens system is increased, thus sharply aggravating the aberrations of the marginal rays in the field of view, particularly, coma, astigmatism and chromatic difference of magnification. It is thus very difficult to increase both the apparent field of view and the eye relief.

SUMMARY OF THE INVENTION

It is an object of the present invention to overcome the above-noted difficulties and to provide an eyepiece lens system in which the eye relief is greater than 80% of the focal length for a field of view more than 60° and in which various aberrations have been well corrected.

To achieve such an object, the eyepiece lens system of the present invention comprises a first lens group, a second lens group disposed rearwardly of the first lens group and a third lens group disposed rearwardly of the second lens group. The first lens group includes a positive meniscus lens component with its convex surface facing rearward. The second lens group includes a cemented positive doublet lens component consisting of a biconvex lens element and a negative meniscus lens element. The third lens group includes at least a positive meniscus lens component with its convex surface facing forward. The eyepiece lens system satisfies certain conditions which will hereinafter be described in detail.

The invention will become more fully apparent from the following detailed description thereof taken in conjunction with the accompanying drawings.

DESCRIPTION OF THE PREFERRED EMBODIMENTS

Figure 1:
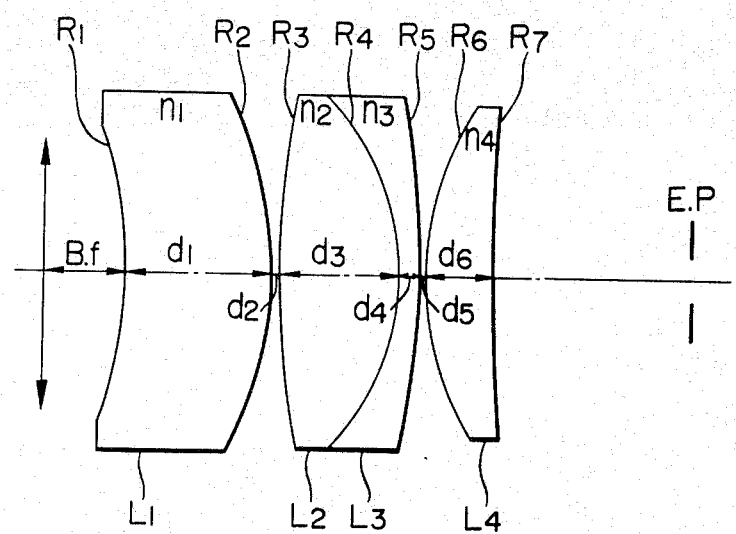
FIG. 1 is a cross-sectional view of the eyepiece lens system having an apparent field of view of 60° according to a first embodiment of the present invention.

The eyepiece of the present invention comprises, in order from the image side, a first lens group consisting of a positive meniscus lens L1 with its concave surface facing the image side, a second lens group consisting of a composite positive lens L2, L3 provided by a biconvex and a negative meniscus lens cemented together, and a third lens group disposed most adjacent to the eye side and having at least a positive meniscus lens with its convex surface facing the image side. The eyepiece satisfies the following conditions and has an apparent field of view more than 60° and an eye relief greater than 80° of the focal length of itself.

$$-2.5f \leq R_1 \leq -f, \quad (1)$$

$$0.65 \leq R_2/R_1 \leq 1.2, \quad (2)$$

$$0.4f \leq d_1 \leq f, \quad (3)$$

$$-1.2f \leq R_4 \leq -0.8f, \quad (4)$$

$$30 < \nu_2 - \nu_3, \quad (5)$$

$$0.1 < n_3 - n_2, \quad (6)$$

$$-3.4f \leq R_5 \leq -2.7f, \quad (7)$$

$$-1.8 \leq R_3/R_5 \leq -1.1, \quad (8)$$

$$f \leq R_i \leq 1.5f, \quad (9)$$

where $f$ represents the total focal length of said eyepiece lens system, $R_1, R_2, \ldots$ represent the curvature radii of the successive surfaces in order from front to rear, $R_i$ represents the curvature radius of the front surface of said positive meniscus lens component of said third lens group, $d_1$ represents the axial thickness of said positive meniscus component of said first lens group, $n_2, n_3, \nu_2,$ and $\nu_3$ represent the refractive indices and the Abbe numbers of said biconvex element and said negative meniscus element of said cemented positive doublet component, respectively.

Each lens group in the eyepiece of the present invention and the significance of each of the conditions shown above will now be explained.

By disposing at the head of the lens system the positive meniscus lens L1 with its concave surface facing the image side and having approximate curvature radii $R_1$ and $R_2$ for both surfaces thereof, the rear principal point of the entire eyepiece lens system is shifted rearwardly. By this, the emergent rays from the last surface $R_{i+1}$ of the third group intersect the optical axis at a greater distance, thus enabling the eye relief to be greater.

In condition (1) above, if the lower limit thereof is exceeded, there may not be provided an eye relief greater than 80% of the focal length. If the upper limit of the condition is exceeded, the front principal point will be too much shifted rearwardly (toward the eye side), so that the image plane will become too close to the surface $R_1$ of the positive meniscus lens L1, and this will lead to a disadvantage that during the use, any flaw in the surface $R_1$ or dust sticking thereto will become more readily noticeable to the eye and in addition, the diameter of the lens system portion subsequent to the lens L1 will be too great, thus bringing about difficulties in good correction of the various aberrations of the marginal rays in the field of view.

Condition (2) will now be considered.

If $R_2/R_1$ exceeds its lower limit, the converging action of the lens L1 will be stronger to thereby enable the converging action of the subsequent lens groups to be weakened and the correction of aberrations in the subsequent lens groups will be easier, but an eye relief greater than 80% of the focal length cannot be expected for an apparent field of view more than 60°.

If, conversely, $R_2/R_1$ exceeds its upper limit, the converging action of the lens L1 may be weakened and the eye relief may be increased while, on the other hand, it becomes necessary to intensify the converging action of the subsequent lens group, so that good correction of aberrations will become difficult.

If the lower limit of condition (3) is exceeded, the eye relief will become smaller. To compensate for this, it is of course necessary that $|R_1|$ be made too small beyond the lower limit of condition (1) and $R_2/R_1$ be made too great beyond the upper limit of condition (2), whereas this will in turn bring about difficulties in good correction of the marginal rays in the field of view, as already noted. If, conversely, $d_1$ is increased, the eye relief will be increased, but if the upper limit is exceeded, there will occur disadvantages similar to those noted when the upper limits of conditions (1) and (2) are exceeded.

The present invention can obtain an eye relief greater than 80% of the focal length within conditions (1), (2) and (3) and can also well correct excess and deficiency of the various aberrations resulting therefrom, by subsequent condition (4) and so on.

Condition (4) is imposed to achieve good correction of chromatic difference of magnification and coma over the entire field of view. This condition is added because, even if the lenses L2 and L3 satisfy conditions (5) and (6) to be described, the use of existing glass material brings about under-correction of the chromatic difference of magnification in the marginal area and a half of the field of view. If the upper limit is exceeded, $|R_4|$ will be too small to thereby bring about symmetrical aberrations, especially, aggravation of coma. The lower limit of this condition (4) is particularly important for the purpose of correcting the aggravation of coma and astigmatism resulting from the increased diameters of the lens L2 and subsequent lenses which in turn have resulted from conditions (1) and (2) for increasing the eye relief.

Conditions (5) and (6) are for correcting chromatic aberrations in the lenses L2 and L3. If the lower limit of condition (5) is exceeded, the chromatic difference of magnification will be under-corrected. If the lower limit of condition (6) is exceeded, the refractive power of the lens L3 will be insufficient to achieve good correction of chromatic aberration. If this correction is to be effected by the second lens group, $|R_4|$ must be made too small beyond the upper limit of condition (4), thus resulting in aggravation of the coma as already noted. Thus, conditions (5) and (6), coupled with condition (4), are for maintaining good balance of chromatic aberration and coma.

According to conditions (7) and (8), the lenses L2 and L3 are in the form of a composite positive lens having a greater radius of curvature for the eye-side surface thereof than for the image-side surface. This relation that $|R_3| < |R_5|$ contributes to shift the principal point of this portion rearwardly (toward the eye side) and increase the eye relief.

If the upper limit of condition (8) is exceeded, such effect will not effectively come out. If the lower limit is exceeded, it will be effective to increase the eye relief but will result in insufficient refractive power of the lens L3 which will also lead to under-correction of the chromatic difference of magnification. Condition (7) is an auxiliary to condition (8) and serves to limit the excess and deficiency of the refractive power of the lens L3. More specifically, if the lower limit of condition (7) is exceeded, there will result over-correction of the chromatic difference of magnification and if the upper limit is exceeded, there will result under-correction of the chromatic difference of magnification.

Condition (9) will now be considered. In the third lens group, particularly, the lens L4 which is most adjacent to the eye side, the marginal rays in the field of view from the greatest angle with the optical axis and moreover, this angle is greater at the eye side than at the image side so that the shape of this lens affects the various aberrations, especially, coma and astigmatism. According to the present invention, $R_i$ is maintained within condition (9) to thereby prevent occurrence of coma in this lens. Further, when the refractive action of this portion is regarded as a prism, occurrence of astigmatism may be minimized by determining the radii of curvature of the forward and rearward surfaces of the positive meniscus lens so as to refract the principal ray at its minimum declination. The upper and lower limits of condition (9) are for the $R_i$ to perform the above-described function in accordance with the upper and lower limits of $R_1$ and $R_2$ and if this range is exceeded, the refractive power of this surface will surffer from excess or deficiency so that the best correction comparable to what has been described above will be difficult to achieve.

In the manner as hitherto described, the present invention provides an eye relief greater than 80% of the focal length for an apparent field of view more than 60° and has well corrected the various aberrations, especially, coma, astigmatism and chromatic difference of magnification, over the entire field of view.

Numerical data in some examples of the present invention will be shown below.

EXAMPLE 1

| $f=100.0,$ | $Bf=32.4,$ | $F/3.6,$ | Apparent field of view 60° | |
|---|---|---|---|---|
| $R_1 = -188.9$ | $d_1 = 62.5$ | $n_1 = 1.62041$ | $\nu_1 = 60.3$ | |
| $R_2 = -139.2$ | $d_2 = 1.7$ | | | |
| $R_3 = 341.7$ | $d_3 = 50.0$ | $n_2 = 1.62041$ | $\nu_2 = 60.3$ | |
| $R_4 = -94.2$ | $d_4 = 8.3$ | $n_3 = 1.80518$ | $\nu_3 = 25.5$ | |
| $R_5 = -288.6$ | $d_5 = 1.7$ | | | |
| $R_6 = 120.5$ | $d_6 = 29.2$ | $n_4 = 1.71300$ | $\nu_4 = 53.9$ | |
| $R_7 = 1916.7$ | | | | |
| Eye relief = 81.4 ($r_6$ according to $r_i$) | | | | |

In this example, the third lens group comprises a single positive lens L4.

EXAMPLE 2

| $f=100.0,$ | $Bf=26.0,$ | $F/3.75,$ | Apparent field of view 70° | |
|---|---|---|---|---|
| $R_1 = -120.8$ | $d_1 = 56.0$ | $n_1 = 1.62041$ | $\nu_1 = 60.3$ | |
| $R_2 = -134.4$ | $d_2 = 1.6$ | | | |
| $R_3 = 387.7$ | $d_3 = 52.0$ | $n_2 = 1.62041$ | $\nu_2 = 60.3$ | |
| $R_4 = -100.0$ | $d_4 = 8.0$ | $n_3 = 1.80518$ | $\nu_3 = 25.5$ | |
| $R_5 = -320.3$ | $d_5 = 1.6$ | | | |
| $R_6 = 237.5$ | $d_6 = 24.0$ | $n_4 = 1.62041$ | $\nu_4 = 60.3$ | |
| $R_7 = -1679.6$ | $d_7 = 1.6$ | | | |
| $R_8 = 132.0$ | $d_8 = 24.0$ | $n_5 = 1.62041$ | $\nu_5 = 60.3$ | |
| $R_9 = 589.2$ | | | | |
| Eye relief = 84.5 ($r_8$ according to $r_i$) | | | | |

In this example 2, the third lens group comprises two positive lenses L'4 and L4 and necessarily, more of the refractive power may be imposed on the third group L'4, L4, so that not only the eye relief can be further increased but also the apparent field of view can be enlarged up to the order of 70°.

Figure 3:
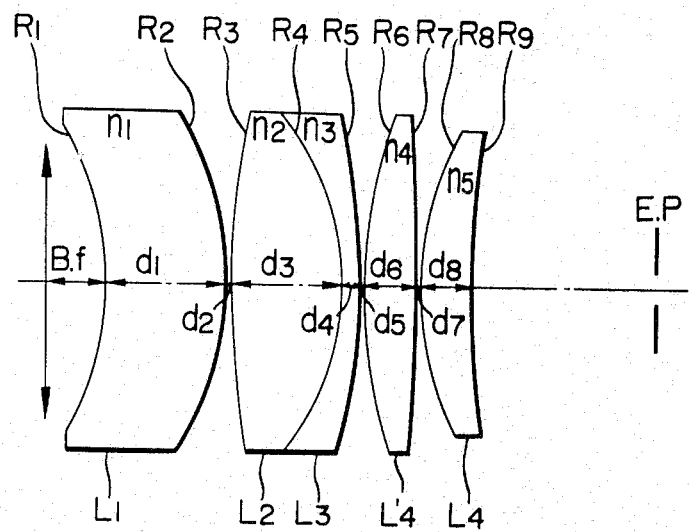
FIG. 3 is a cross-sectional view of the eyepiece lens system having an apparent field of view of 70° according to a second embodiment of the present invention.
Figure 2:
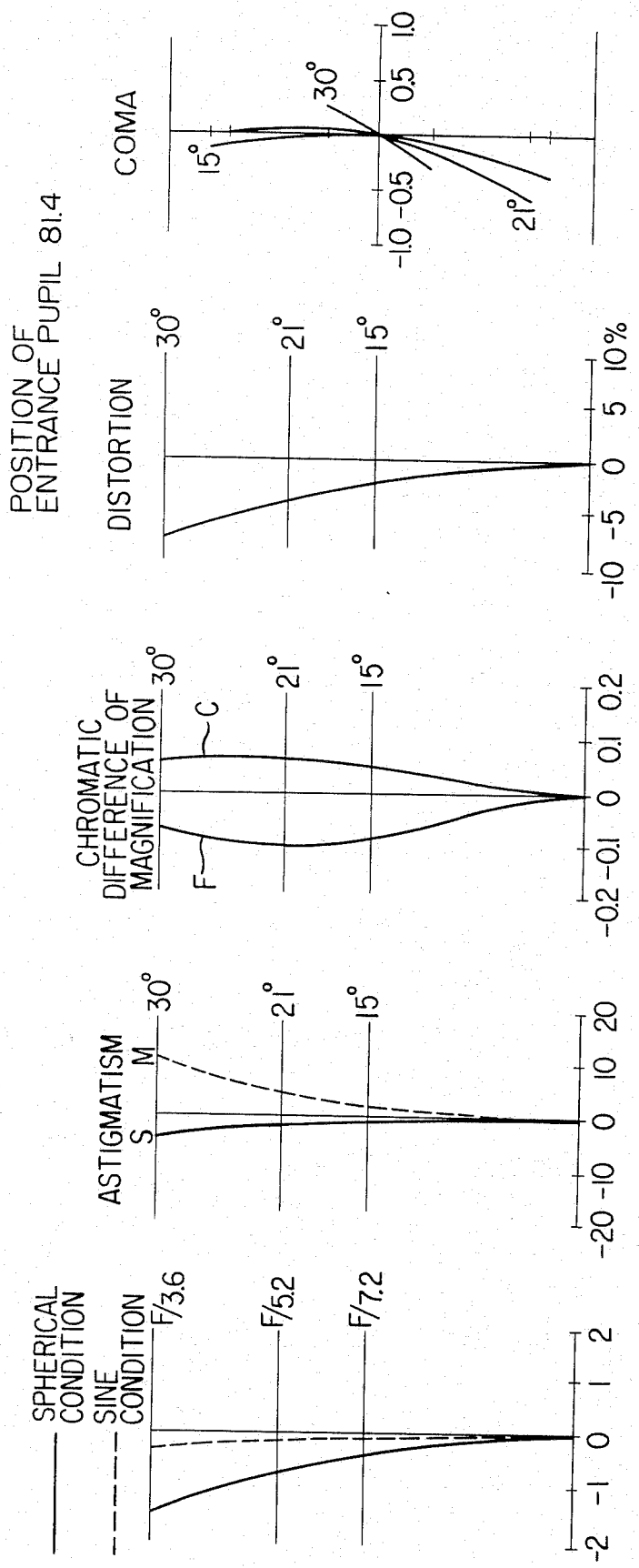
FIG. 2 is a graph illustrating the curves of various aberrations in the first embodiment.
Figure 4:
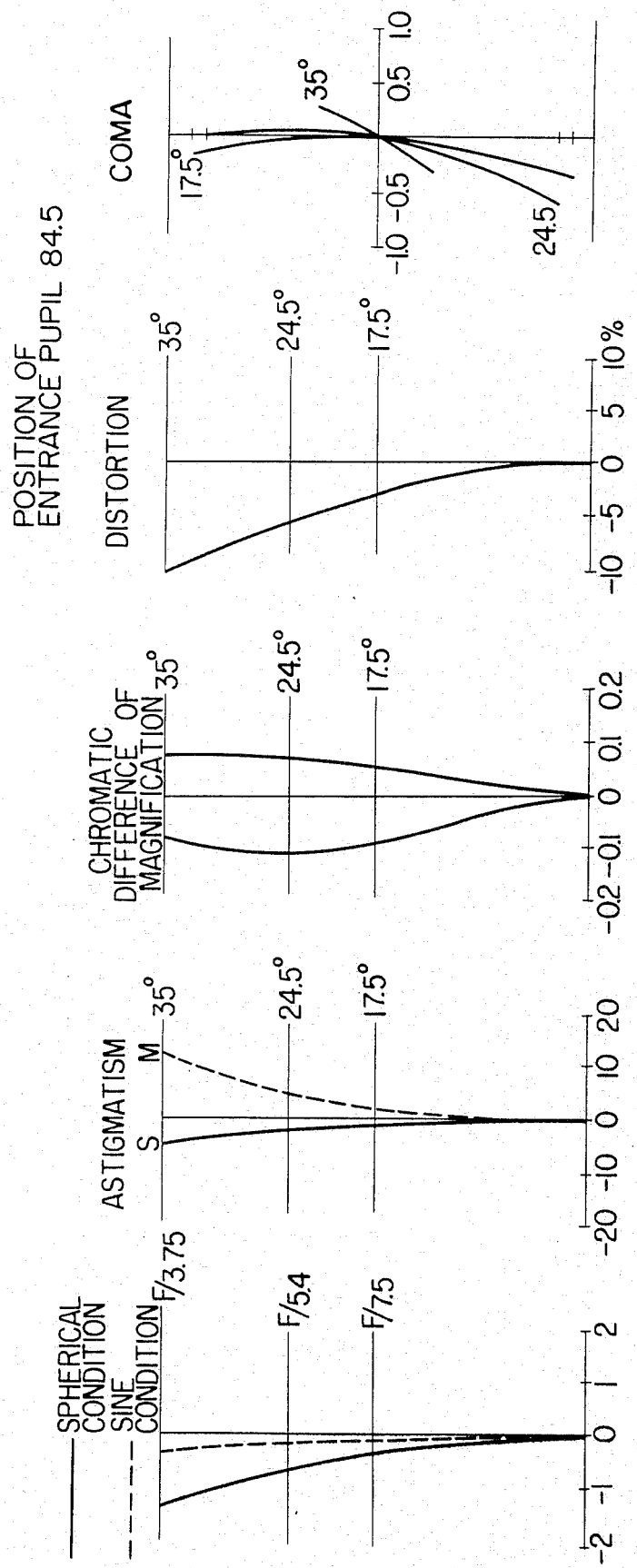
FIG. 4 is a graph illustrating the curves of various aberrations in the second embodiment.

The lens arrangement in Examples 1 and 2 are shown in FIGS. 1 and 3, respectively, and the spherical aberration, astigmatism, chromatic difference of magnification and distortion measured by tracing the eyepiece of Examples 1 and 2 from the eye point side are shown in FIGS. 2 and 4, respectively. Also, in Tables 1 and 2 below, the Seidel coefficients in Examples 1 and 2 when $f=1$ are shown in M. Berek's expression.

$R_1, R_2, \ldots$, represent the curvature radii of the successive lens surfaces in order from the image side, $d_1, d_2, \ldots$, the distances between the adjacent verteces of the successive lens surfaces, $n_1, n_2, \ldots$, the refractive indices of the respective lenses, $\nu_1, \nu_2, \ldots$, the Abbe numbers of the respective lenses. B.f is the value measured by tracing the light rays from eye point side.

Table 1

| $\nu$ | A$\nu$ | B$\nu$ | T$\nu$ | P$\nu$ | □$\nu$ |
|---|---|---|---|---|---|
| 1 | 0.000 | 0.001 | −0.011 | −0.020 | 0.574 |
| 2 | 0.873 | 0.210 | 0.051 | 0.318 | 0.089 |
| 3 | −0.005 | 0.030 | −0.186 | 0.155 | 0.192 |
| 4 | −0.017 | −0.035 | −0.071 | −0.067 | −0.278 |
| 5 | 0.351 | 0.043 | 0.005 | 0.112 | 0.014 |
| 6 | −0.006 | 0.041 | −0.267 | 0.275 | −0.050 |
| 7 | 0.110 | −0.088 | 0.070 | −0.203 | 0.106 |
| Σ | 1.306 | 0.202 | −0.409 | 0.610 | 0.647 |

Table 2

| $\nu$ | A$\nu$ | B$\nu$ | T$\nu$ | P$\nu$ | □$\nu$ |
|---|---|---|---|---|---|
| 1 | −0.001 | 0.006 | −0.030 | −0.064 | 0.476 |
| 2 | 0.545 | 0.070 | 0.009 | 0.290 | 0.038 |
| 3 | −0.021 | 0.046 | −0.100 | 0.023 | 0.167 |
| 4 | 0.531 | 0.087 | 0.015 | 0.160 | 0.029 |
| 5 | −0.048 | 0.083 | −0.146 | 0.140 | 0.011 |
| 6 | 0.001 | 0.004 | 0.011 | −0.064 | −0.146 |
| 7 | 0.374 | 0.102 | 0.028 | 0.099 | 0.035 |
| 8 | −0.032 | 0.083 | −0.214 | 0.285 | −0.183 |
| 9 | 0.091 | −0.096 | −0.115 | −0.101 | 0.227 |
| Σ | 1.440 | 0.385 | −0.542 | 0.768 | 0.654 |

What is claimed is:

1. An eyepiece lens system having an apparent field of view more than 60° and an eye relief greater than 80% of the total focal length of itself, comprising a first lens group, a second lens group disposed rearwardly of said first lens group and a third lens group disposed rearwardly of said second lens group, said first lens group including a positive meniscus lens component with its convex surface facing rearward, said second lens group including a cemented positive doublet lens component consisting of a biconvex lens element and a negative meniscus lens element, said third lens group including at least a positive meniscus lens component with its convex surface facing forward, said eyepiece lens system satisfying the following conditions:

$-2.5f \leq R_1 \leq -f$ (1)

$0.65 \leq R_2/R_1 \leq 1.2$ (2)

$0.4f \leq d_1 \leq f$ (3)

$-1.2f \leq R_4 \leq -0.8f$ (4)

$30 < \nu_2 - \nu_3$ (5)

$0.1 < n_3 - n_2$ (6)

$-3.4f \leq R_5 \leq -2.7f$ (7)

$-1.8 \leq R_3/R_5 \leq -1.1$ (8)

$f \leq R_i \leq 1.5f$ (9)

where $f$ represents the total focal length of said eyepiece lens system, $R_1, R_2, \ldots$ represent the curvature radii of the successive surfaces in order from front to rear, $R_i$ represents the curvature radius of the front surface of said positive meniscus lens component of said third lens group, $d_1$ represents the axial thickness of said positive meniscus component of said first lens group, $n_2, n_3, \nu_2$ and $\nu_3$ represent the refractive indices and the Abbe numbers of said biconvex element and said negative meniscus element of said cemented positive doublet component, respectively; and wherein said lens system satisfies the following data:

| total focal length 100.0, back focal length 32.4 F-number 3.6, apparent field of view 60°, eye relief 84.5 | | | |
|---|---|---|---|
| $R_1 = -188.9$ | $d_1 = 62/5$ | $n_1 = 1.62041$ | $\nu_1 = 60.3$ |
| $R_2 = -139.2$ | $d_2 = 1.7$ | | |
| $R_3 = 341.7$ | $d_3 = 50.0$ | $n_2 = 1.62041$ | $\nu_2 = 60.3$ |
| $R_4 = -94.2$ | $d_4 = 8.3$ | $n_3 = 1.80518$ | $\nu_3 = 25.5$ |
| $R_5 = -288.6$ | $d_5 = 1.7$ | | |
| $R_6 = 120.5$ | $d_6 = 29.2$ | $n_4 = 1.71300$ | $\nu_4 = 53.9$ |
| $R_7 = 1916.7$ | | | | where $R_1, R_2, \ldots$ represent the curvature radii of the successive surfaces in order from front to rear, $d_1, d_2, \ldots$ represent the axial distances between successive surfaces of the lenses, $n_1, n_2, \ldots$ and $\nu_1, \nu_2, \ldots$ represent the refractive indices and Abbe numbers, respectively, of the respective lens components.

2. An eyepiece lens system having an apparent field of view more than 60° and an eye relief greater than 80% of the total focal length of itself, comprising a first lens group, a second lens group disposed rearwardly of said first lens group and a third lens group disposed rearwardly of said second lens group, said first lens group including a positive meniscus lens component with its convex surface facing rearward, said second lens group including a cemented positive doublet lens component consisting of a biconvex lens element and a negative meniscus lens element, said third lens group including at least a positive meniscus lens component with its convex surface facing forward, said eyepiece lens system satisfying the following conditions:

$-2.5f \leq R_1 \leq -f$ (1)

$0.65 \leq R_2/R_1 \leq 1.2$ (2)

$0.4f \leq d_1 \leq f$ (3)

$-1.2f \leq R_4 \leq -0.8f$ (4)

$30 < \nu_2 - \nu_3$ (5)

$0.1 < n_3 - n_2$ (6)

$-3.4f \leq R_5 \leq -2.7f$ (7)

$-1.8 \leq R_3/R_5 \leq -1.1$ (8)

$f \leq R_i \leq 1.5f$ (9)

where $f$ represents the total focal length of said eyepiece lens system, $R_1, R_2, \ldots$ represent the curvature radii of the successive surfaces in order from front to rear, $R_i$ represents the curvature radius of the front surface of said positive meniscus lens component of said third lens group, $d_1$ represents the axial thickness of said positive meniscus component of said first lens group, $n_2, n_3, \nu_2$ and $\nu_3$ represent the refractive indices and the Abbe numbers of said biconvex element and said negative meniscus element of said cemented positive doublet component, respectively; and wherein said lens system satisfies the following data:

| total focal length 100.0, back focal length 26.0 F-numbers 3.75, apparent field of view 70°, eye relief 84.5 | | | |
|---|---|---|---|
| $R_1 = -120.8$ | $d_1 = 56.0$ | $n_1 = 1.62041$ | $\nu_1 = 60.3$ |
| $R_2 = -134.4$ | $d_2 = 1.6$ | | |
| $R_3 = 387.7$ | $d_3 = 52.0$ | $n_2 = 1.62041$ | $\nu_2 = 60.3$ |
| $R_4 = -100.0$ | $d_4 = 8.0$ | $n_3 = 1.80518$ | $\nu_3 = 25.5$ |
| $R_5 = -320.3$ | $d_5 = 1.6$ | | |
| $R_6 = 237.5$ | $d_6 = 24.0$ | $n_4 = 1.62041$ | $\nu_4 = 60.3$ |
| $R_7 = -1679.6$ | $d_7 = 1.6$ | | |

-continued

| total focal length 100.0, back focal length 26.0 F-numbers 3.75, apparent field of view 70°, eye relief 84.5 | | | |
|---|---|---|---|
| $R_8 = 132.0$ | $d_8 = 24.0$ | $n_5 = 1.62041$ | $\nu_5 = 60.3$ |
| $R_9 = 589.2$ | | | | where $R_1, R_2, \ldots$ represent the curvature radii of the successive surfaces in order from front to rear, $d_1, d_2, \ldots$ represent the axial distances between successive surfaces of the lenses, $n_1, n_2, \ldots$ and $\nu_1, \nu_2, \ldots$ represent the refractive indices and Abbe numbers, respectively, of the respective lens components.

* * * * *